July 15, 1947.  W. HEER  2,424,031
MACHINE FOR MACHINING ANY KIND OF CURVED SURFACES
Filed March 20, 1945  4 Sheets-Sheet 1

Inventor
Walter Heer
By Dodge
Attorneys

July 15, 1947. W. HEER 2,424,031
MACHINE FOR MACHINING ANY KIND OF CURVED SURFACES
Filed March 20, 1945 4 Sheets-Sheet 3
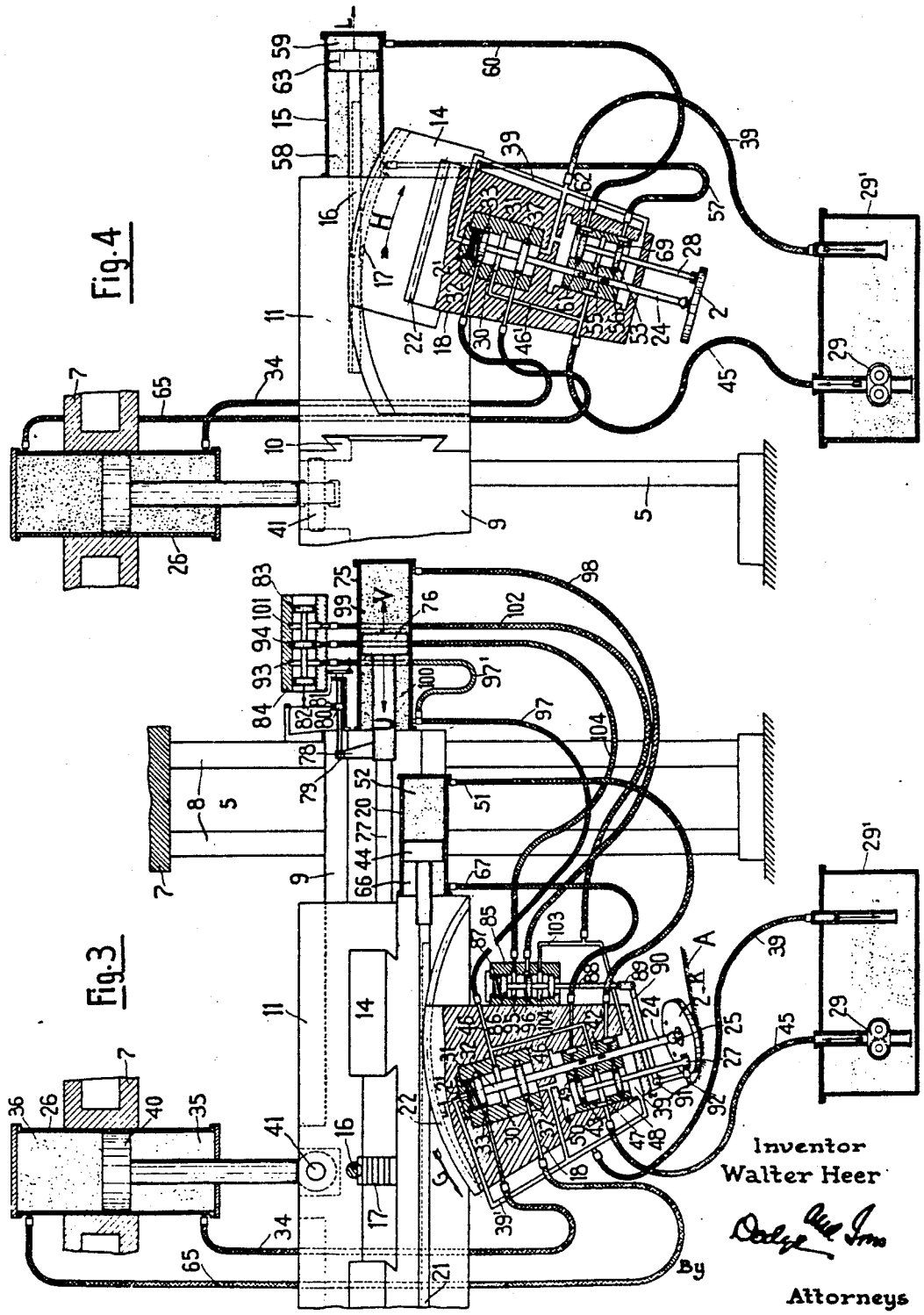
Inventor
Walter Heer
By
Attorneys July 15, 1947.  W. HEER  2,424,031
MACHINE FOR MACHINING ANY KIND OF CURVED SURFACES
Filed March 20, 1945  4 Sheets-Sheet 4
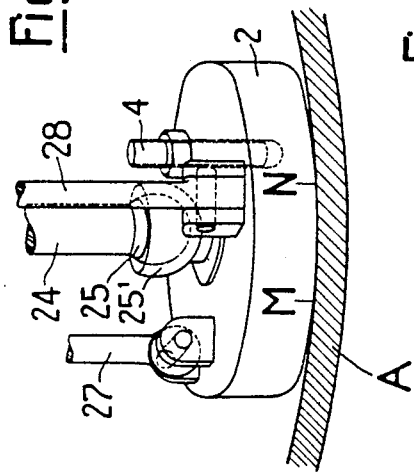
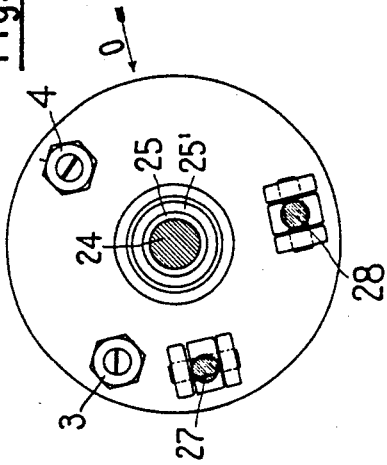
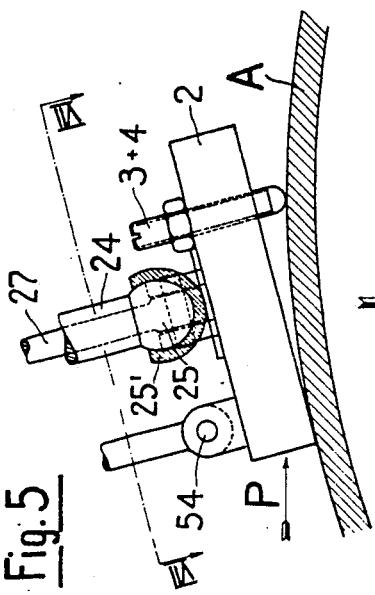
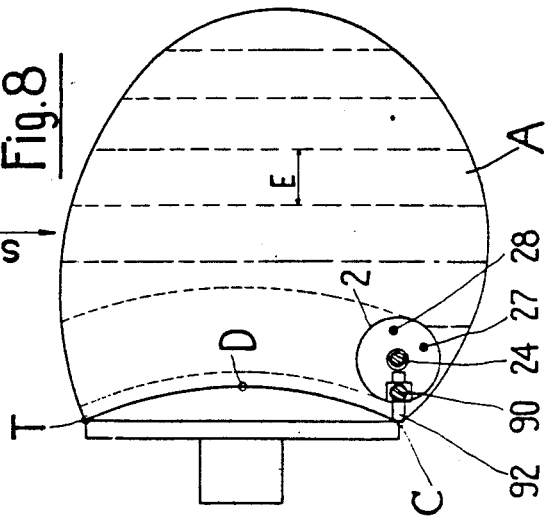
Inventor
Walter Heer
By  Dodge
Attorneys

UNITED STATES PATENT OFFICE 2,424,031

MACHINE FOR MACHINING ANY KIND OF CURVED SURFACES

Walter Heer, Zurich, Switzerland, assignor to Escher Wyss Maschinenfabriken Aktiengesellschaft, Zurich, Switzerland, a corporation of Switzerland Application March 20, 1945, Serial No. 583,797
In Switzerland April 15, 1944

10 Claims. (Cl. 90—13.5)

1

This invention relates to a machine for machining any desired kind of curved surfaces, particularly those of Kaplan turbine blades, blades of ship and aeronautical propellers and the like.

Various methods and constructional types of machines are known for machining curved surfaces by means of finger, shaft or disc milling cutters in a copying process. In such methods the pattern surface is ordinarily tapped off in lines by a feeler and the surface of the blank correspondingly treated in lines by the milling cutter, the advance of the lines having to be more or less fine according to the degree of fineness of the surface which is desired. If sharply curved or warped surfaces have to be machined then the radius of curvature of the milling cutter blade must be comparatively small, the result of which is that the distance between the lines described by the milling cutter is also small and the sharply curved cutting surface leaves deep tracks in the blank. Between the various lines residues of the material, so-called combs, are also left on the blank which have to be subsequently machined off. In most cases grinding tools are used for this purpose. In all cases however the removal of the combs entails a large expenditure of work and labour.

It has also been already proposed to machine the blades of Kaplan turbine wheels on a lathe with feeler control for the cutting tool. In such machines however the accuracy of the copying is not so great as it is when milling cutters are used. This is due to the fact that the cutting speed of the turning tool must be as high as possible so as not to make the time of machining too long. In such case the speeds of the controlled elements are correspondingly high so that the moved masses of these elements can no longer be accurately controlled and the work of copying therefore becomes inaccurate in comparison with milling cutters controlled by feelers. This disadvantage can, it is true, be avoided at least partially by allowing the lathe to run more slowly which however involves a longer time for machining. Similar conditions exist when planing machines controlled by feelers, which have also been previously used, are employed for the machining of curved surfaces.

The object of the present invention is to provide a machine of the kind hereinbefore referred to in which the above mentioned drawbacks are avoided and also considerably shorter times for machining can be obtained than in the hitherto constructed machines with tools controlled by feelers. These advantages are secured according

2 to this invention by the fact that the feeler-controlled tool, which for example may be constructed in the form of a flat milling tool or grinding disc, can be rocked in all directions about a point in the axis of its spindle close to the cutting face of the disc. In such case the feeler which taps off the pattern may also conveniently control a controlling arrangement which controls the movement of the tool in a vertical direction and also two other controlling arrangements which control the rocking movements of the tool in two planes situated at right angles to each other.

A constructional form of the subject matter of the invention is shown by way of example in the accompanying drawings in which:

Fig. 3 shows—partly in a simplified mode of representation—the working connection between various elements of this milling machine, the said elements being separated for the sake of clearness and shown on different scales.

Fig. 4 shows in part the same elements as Fig. 3 in a section which, with relation to the section shown in Fig. 3, is nearly at right angles thereto, and in part other elements.

Fig. 5 shows on a larger scale in the direction of the arrow O in Fig. 7 the feeler disc and the elements connected therewith, part of the pattern also being shown in section.

Fig. 6 is a perspective view seen in the direction of the arrow P in Fig. 5, this view clearly showing the contact of the feeler disc over a comparatively large curved portion of the pattern.

Fig. 7 is a section on the line VII—VII of Fig. 5, the pattern being omitted for the sake of clearness, and Fig. 8 shows in a plan view the copying pattern and the feeler disc tapping off this pattern.

Figure 1:
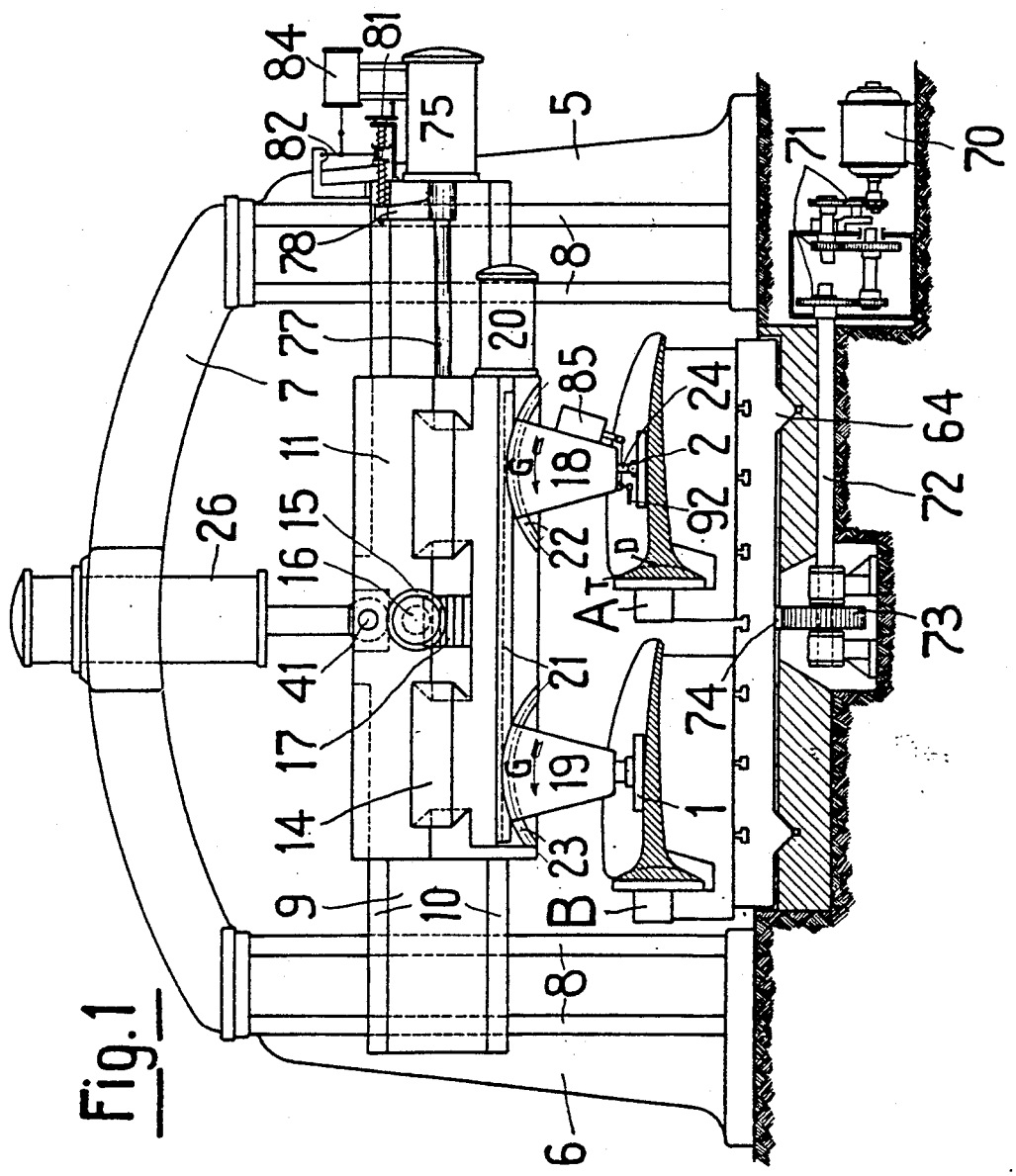
Fig. 1 is a front elevation thereof.

In the figures, A denotes a pattern to be copied and B a blank to be machined. 1 is a tool constructed as a flat milling cutter and 2 a feeler disc corresponding to the form of the milling cutter tool. Said feeler disc is caused by springs 2¹ (Figs. 3 and 4) to bear against the copying pattern A. The pattern A and the blank B are chucked on the same carriage 64 to which a feed movement is imparted at right angles to the plane of the drawing in Fig. 1 by means of a toothed rack 74 which engages with a toothed wheel 73 fixed to a shaft 72. This latter is driven by a motor 70 through a variable speed gear 71.

The feeler disc 2 is connected, in the manner shown on a larger scale in Figs. 5 and 6, through a ball and socket joint 25¹, 25 to a rod 24 so as to be capable of moving in all directions. The rod 24 is rigidly connected to a controlling valve 32 (see Figs. 3 and 4) which will be described more in detail hereinafter and this controlling valve 32 is arranged to move in a vave casing 18. The necessary adjustment of the feeler disc 2 relatively to the surface to be machined of the pattern A is effected by the aid of two adjustable screws 3 and 4 (see Figs. 5, 6 and 7). As shown in Figs. 5 and 6 the disc 2 can be so adjusted by means of these screws 3, 4 that it will bear over a comparatively large curved portion M—N of the pattern A, which curved portion of this latter can be regarded as a third "contact point" of the feeler disc 2. To the feeler disc 2 are also pivotally connected two rods 27 and 28, of which the rod 27 is rigidly connected to a controlling valve 43 (see Fig. 3) and the rod 28 rigidly connected to a controlling valve 53 (see Fig. 4). The controlling valves 43 and 53 are likewise movable in the hereinbefore mentioned casing 18.

Figure 2:
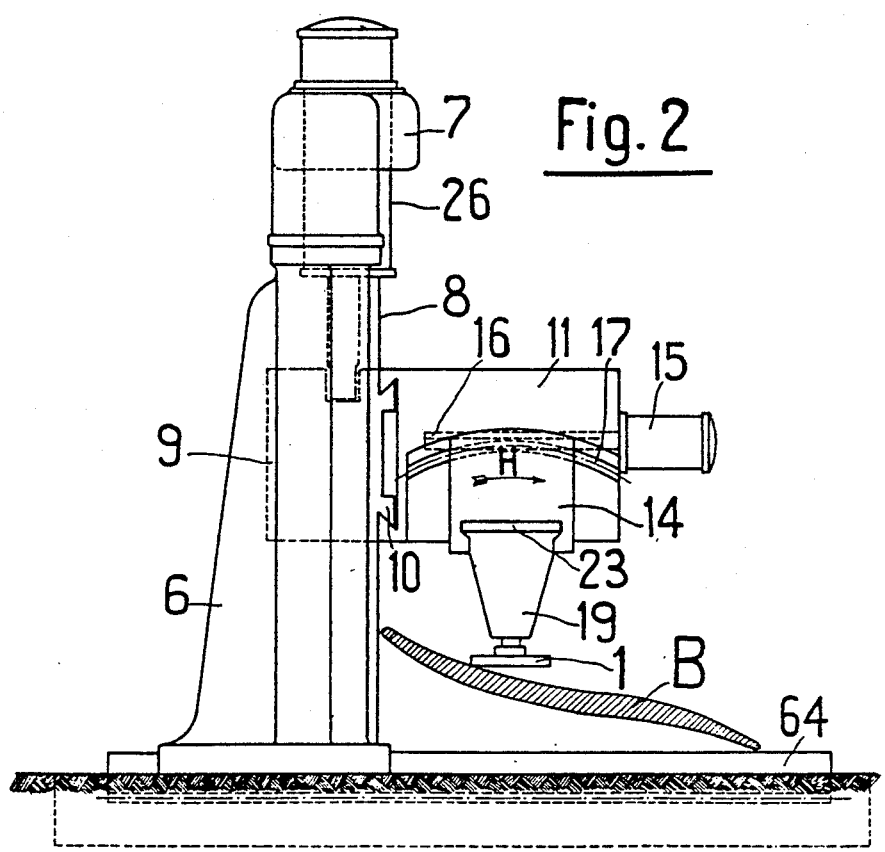
Fig. 2 is a side elevation of a copying milling machine.

5 and 6 denote two standards, which are rigidly connected to each other at their ends by a transverse member 7. On these standards 5 and 6 are provided slideways 8 which serve to guide a cross beam 9 carrying a carriage 11. The cross beam 9 is moved by a controlling arrangement to be more fully described hereinafter and well known per se in dependence on the movements of the feeler disc 2 in a vertical direction. Said carriage 11 is movable horizontally on the transverse member 9 along guides 10 by a mechanism described more fully later on. The carriage 11 carries a beam 14 which projects beyond its lower end and can be rocked in the direction of the arrows H shown in Figs. 2 and 4 and also in the opposite direction. Such rocking movements are directed by arcuate guides whose center is on the geometric axis of the feeler rod at a point adjacent the feeling surface produced when the piston 63 (see Fig. 4) of a servomotor 15 (see Figs. 2 and 4) attached to the carriage 11 moves under the action of a liquid under pressure, as this piston 63 is rigidly connected to a rack 16 which gears into a toothed segment 17 shaped like the arc of a circle and mounted on the beam 14. The admission and discharge of the fluid under pressure to and from the spaces on both sides of the servomotor piston 63 is controlled in a manner to be more fully described hereafter by the already mentioned controlling valve 53 in dependence on the movements of the feeler disc 2. The beam 14 carries in its turn the hereinbefore mentioned casing 18 and also a gear box 19 which is arranged symmetrically with regard to the transverse central plane of the carriage 11 and carries the tool 1. The valve casing 18 can be rocked in a segmental guide 22 whose center is on the geometric axis of the feeler rod 24 adjacent the lower or feeling surface of the disc 2. Similarly, the box 19 can be rocked in the curved segmental guide 23 whose center is similarly located on the axis of rotation of tool disc 1. The direction of such rocking motion is indicated in Figs. 1 and 3 by the arrows G. The casing 18 and the gear box 19 receive the driving power for their rocking movements from the piston 44 (see Fig. 3) of a servomotor 20 operated by a liquid under pressure and attached to the beam 14. This servomotor piston 44 is rigidly connected to a rack 21 which cooperates both with the guide 22 which is constructed as an arc-shaped rack segment and carried on the valve casing 18 and with the guide 23 also constructed as an arc-shaped rack segment and carried on the box 19. The admission and discharge of the liquid under pressure to and from the spaces on both sides of the servomotor piston 44 is controlled in dependence on the movements of the feeler disc 2 by the controlling valve 43.

With the help of the above mentioned three controlling valves 32, 43 and 53, which are all housed in the casing 18, three hydraulically controlled movements can be obtained namely: (1) a movement of the carriage 11 in a vertical direction controlled by the valve 32 and produced by a servomotor 26, (2) a rocking movement of the beam 14 in the direction of the arrow H (see Fig. 4) or in the opposite direction thereto controlled by the controlling valve 53 and produced by the servomotor 15, and (3) a rocking movement of the controlling casing 18 and of the box 19 in the direction of the arrow G or in the opposite direction thereto controlled by the controlling valve 43 and produced by the servomotor 20. In this arrangement the movement according to (1) is taken off by means of the rod 24, the movement according to (2) by means of the rod 28 and the movement according to (3) by means of the rod 27 all from the feeler disc 2.

The construction of the several controlling arrangements and their mode of action will now be described in greater detail, reference being made principally to Figs. 3 and 4. In these figures 29 denotes a pump, which forces a medium under pressure drawn from a tank 29¹ continuously through a flexible pipe 45 into an annular space 47 in a sleeve 42 and by way of this annular space 47 through a pipe 46 also into the annular space 30 in a sleeve 31 which acts as a guide for the controlling valve 32. In the said sleeve 31 there are also two other annular spaces 33 and 37. If now for example the pattern A be moved in the direction of the arrow K shown in Fig. 3 this will cause the feeler disc 2 to be moved upwards. This movement is transmitted through the rod 24 also to the controlling valve 32, which will consequently be moved in the direction of the arrow F shown in Fig. 3, so that now liquid under pressure can pass out of the annular space 30 into the annular space 33. The medium under pressure passes out of this latter through a flexible pipe 34 into the space 35 underneath the piston 40 of the servomotor 26. Simultaneously the space 36 above the piston 40 is connected by a flexible pipe 65 with the annular space 37 in the sleeve 31; the space 37 now is also connected with a discharge pipe 39 which discharges into the tank 29¹, from which the pump 29 draws. In the position described of the controlling valve 32 the piston 40 of the servomotor 26 therefore moves upwards and carries with it the carriage 9, to which it is connected by the bolt or pin 41, and also the beams 11, 14, the casing 18 and the box 19. In this way a restoring movement between the sleeve 31 and the controlling valve 32 is brought about so that the connection between the annular spaces 30 and 33 through the valve 32 is again interrupted. When the controlling valve 32 is moved downwards out of its mid-position the controlling operations will take place in the reverse order, the carriage 9 being then moved downwards.

The sleeve 42 which serves to guide the controlling valve 43 (see Fig. 3) in which three annular spaces 47, 48 and 49 are provided, is rigidly connected to the rod 24 and arranged to move in the casing 18. When the above mentioned upward movement of the feeler disc 2 takes place, the sleeve 42 and the controlling valve 43, which is pivoted through the rod 27 to the disc 2, will be raised by the same amounts, so that the controlling valve 43 receives no movement relatively to the sleeve 42 and therefore does not initiate any controlling actions. The same thing applies also to the controlling valve 53, which is pivoted by means of the rod 28 to the disc 2, and also for a sleeve 69 which acts as a guide for the valve 53 and is likewise rigidly connected to the rod 24.

As soon however as the feeler disc 2 which taps off the pattern A is rocked in such a way that it can bring about a relative movement between the sleeve 42 and the controlling valve 43, then movements of the servomotor piston 44 can also be brought about. For example if the feeler disc 2 be rocked in a counterclockwise direction in the ball and socket joint 25, 25¹ the controlling valve 43 will be moved out of its mid-position downwards. Liquid under pressure continuously delivered by the pump 29 through the flexible pipe 45 into the annular space 47 of the sleeve 42 can now pass into the annular space 48 in the sleeve 42 and out of this space through the flexible pipe 51 into the space 52 on the right hand side of the piston 44 of the servomotor 20. At the same time liquid under pressure can pass off out of the space 66 on the left hand side of the piston 44 through a flexible pipe 67, a third annular space 49 in the sleeve 42 and a pipe 39¹ into the discharge pipe 39. The servomotor piston 44 and the rack 21 connected thereto will therefore be moved towards the left, so that the casing 18 and the box 19 carrying the tool 1 will be rocked in the direction of the arrow G. This will cause also a restoring movement between the controlling valve 43 and the sleeve 42 to be initiated, during the course of which the connection between the annular spaces 47 and 48 is interrupted again by the valve 43 and the controlling operation thereby terminated. If on the other hand the feeler disc 2 be rotated about the point 25 in a clockwise direction, the above described controlling operations will take place in the reverse direction.

A rocking movement of the feeler disc 2 in a clockwise direction in the ball and socket joint 25, 25¹ will also result, if reference be made to Fig. 4, in the rod 28 being moved downwards together with the controlling valve 53, so that this latter will be moved relatively to the sleeve 69 and the three annular spaces 55, 56, 61 provided therein in such a way that the annular space 55 likewise supplied constantly through the flexible pipe 45 with liquid under pressure delivered continuously by the pump 29 will be connected with the annular space 56, so that liquid under pressure can pass through a flexible pipe 57 into the space 58 on the left hand side of the piston 63 of the servomotor 15. At the same time liquid under pressure can now pass off out of the space 59 on the right hand side of the piston 63 through a flexible pipe 60, out of the space 62 above the controlling valve 53 and through pipe 39 into the tank 29¹. The servomotor piston 63 and the rack 16 rigidly connected thereto are therefore moved in the direction of the arrow L shown in Fig. 4 and this movement will be converted through the toothed segment 17 into a rocking movement of the beam 14, which carries the box 19 with the tool 1 and the valve casing 18, in the direction of the arrow H, that is to say in a clockwise direction. This however will bring about also a restoring movement of the controlling valve 53 relatively to the sleeve 69 whereby the connection between the annular spaces 55 and 56 will be again interrupted and the controlling movement consequently terminated.

In the machine described the valve mechanism continuously positions the housing 18 so that the axis of feeder shaft 24 is normal to that face of the feeler disc 22 presented to the pattern. Furthermore, the casing 18 and the box 19 carrying the tool 1 will have exactly the same movements imparted to them so that an accurate transference of the movements of the feeler disc 2, caused by the surfaces of the pattern, to the tool 1 operating on the blank B, will be brought about. The tool 1 is positioned with the same angularity to the surface to be finished on the work piece, that the studs 3 and 4 establish relatively to the pattern.

The mechanism will now be described which serves for moving the carriage 11 along the guides 10 in the direction of the arrows U and V shown in Fig. 3. This mechanism comprises a servomotor casing 75 fixed to the transverse member 9, a movable piston 76 being arranged in said casing 75. A rod 77 made in one piece with the piston 76 is rigidly connected to the carriage 11 and also to a bracket 78. The latter serves as a bearing for one end of a spindle 79 having a right-hand thread, which co-operates with a nut 80 and carries a handwheel 81 outside another bearing at the right-hand end. To the nut 80 is pivoted a lever 82 and to the latter a controlling valve 83. On the handwheel 81 being turned the controlling valve 83 is displaced within a casing 84. In casing 84 there are three annular spaces 93, 94, 101. The annular space 94 is connected by a flexible pipe 104 to the annular space 95 of a further valve casing 85 fixed to the valve casing 18 to which reference has already been made. The annular space 93 is connected by a flexible pipe 97¹ to a flexible pipe 97, one end of which is connected to the pipe 46 in the valve casing 18 whilst the other end opens into the space 100 of the servomotor casing 75 to the left of piston 76. The third annular space 101 is finally connected by a flexible pipe 102 to a pipe 103, which in its turn is connected to an annular space 104 in valve casing 85 and further to a space 39² in the valve casing 18. The space 39² communicates through the above mentioned pipe 39¹ with the discharge pipe 39 to which reference has likewise been made. The space 99 of the servomotor casing 75, which is on the right of piston 76, is connected by a flexible pipe 98 to an annular space 96 of the valve casing 85. In this casing 85 a controlling valve 86 is arranged which a spring 87 normally urges against a shoulder on the lower end of casing 85, in which position a connection is brought about through the annular spaces 95 and 96 between the flexible pipes 104 and 98. The controlling valve 86 is rigidly connected to a rod 88 and the latter is pivotally connected by means of a link 89 to a bell crank 90 which carries a feeler 92 and is itself pivoted at point 91. The parts 85, 86 form together a so-called "evading device," the purpose of which is, for example, to protect the boss of a propeller from being milled when the blade surfaces are being machined.

With the aid of the controlling valve 83 which can be adjusted as desired by means of handwheel 81, the width E (Fig. 8) of the linear tapping off of the copying pattern A can be adjusted as required. If, for example, a movement in the direction of arrow U shall be imparted to the carriage 11, then the handwheel 81 has to be moved in the clockwise sense, whereby the nut 80, referring to Fig. 3, is moved to the right, so that rod 82 is moved in a counter-clockwise sense and the controlling valve 83 thus displaced from the mid-position shown in Fig. 3 towards the right. The result of this is that a connection between the annular spaces 93, 94 of the valve casing 84 is established, so that at least a part of the liquid under pressure, which the pump 29 continually delivers through annular space 47 of the sleeve 42 into pipe 46 can pass first through the flexible pipes 97, 91$^1$ into the annular space 93 and thence into the annular space 94. From the latter the liquid passes through the flexible pipe 104 into the annular space 95 of valve casing 85 and from this annular space through annular space 96 and flexible pipe 98 into space 99 to the right of piston 76, so that the latter is moved in the direction of arrow U as desired. This movement is then also imparted to the carriage 11. The liquid hereby forced out of space 100 to the left of piston 76 flows into pipe 97$^1$, whereby in pipe 97 below the connection point of pipe 97$^1$, the liquid under pressure delivered by pump 29 is impounded. The piston rod 77 when moving in the direction of arrow U carries along the threaded spindle 79 which is mounted in support 78, thus imparting a restoring movement to the controlling piston 83 in casing 84, with the result that after a certain time the connection between annular spaces 93, 94 is again interrupted and the movement of carriage 11 in the direction of arrow U consequently interrupted.

If a displacement of carriage 11 in the direction of arrow V is desired, then the handwheel 81 must be turned in an anticlockwise sense, which leads to the controlling valve 83 being moved from its mid-position towards the left, so that the annular spaces 94 and 101 of the valve casing 84 are caused to communicate with one another. Thus a connection between space 99 to the right of piston 76 and pipe 103 connected to the discharge 39 is established via pipe 98, annular space 96, annular space 95, pipe 104, annular space 94, annular space 101 and pipe 102. The liquid under pressure forced by pump 29 into pipe 97 and from the latter into space 100 to the left of piston 76 is now capable of moving piston 76 and with it carriage 11 in the direction of arrow V. A restoring movement is in this case also imparted to the parts 77, 78, 79, 80, 82, so that the movement of the carriage 11 in the direction of arrow V is interrupted after a certain period.

As is evident from the foregoing the number of lines along which the pattern is tapped off can be arbitrarily varied with the aid of handwheel 81.

In order to ensure that at places where the blade passes over chamfered surfaces to the cylindrical blade root, the surface of the blade can nevertheless be machined as close as possible to such transition surfaces without the tool that is being used at the moment coming in contact with the chamfered surfaces, the evading device 85, 86 hereinbefore referred to and influenced by feeler 92 has to come into operation. The manner in which this takes place shall now be described with reference to Figs. 1, 3 and 8. The references C and T in Figs. 1 and 8 designate the places where the transition of the blade proper into the cylindrical blade root commences, and the reference D indicates a point where a movement changes its direction.

Let it be assumed that the feeler 92 has been caused to bear against point C owing to an operation of handwheel 81. By this movement of handwheel 81 the controlling valve 83 has been displaced from its mid-position towards the right, so that the annular spaces 93, 94 in casing 84 are now connected to one another. As soon as the carriage 64 is moved in the direction of the arrow S shown in Fig. 8, the feeler 92 is forced to the right by the chamfered transition surface commencing at point C, so that the angular lever 90 is turned in a counter-clockwise sense about journal 91 and the controlling valve 86 raised against the action of spring 87. As a result of this a connection between the annular spaces 96 and 104 in casing 85 is established, so that liquid under pressure can now flow out of space 99 to the right of piston 76 through flexible pipe 98, annular chambers 96, 104, pipe 103, chamber 39$^2$ and pipe 39$^1$ into the discharge pipe 39. At the same time liquid under pressure can pass through pipe 97 into space 100 to the left of piston 76, so that the carriage 11 is moved in the direction of arrow V, i. e. feeler 92 is moved away from the chamfered transition surface. At the same time the controlling valve 83 is moved still further towards the right. The movement in the direction of arrow V continues until feeler 92 has reached point D. From this moment no force is, during the further displacement of carriage 96 in the direction of arrow S, exerted by the pattern A on feeler 92 with the tendency of moving the latter to the right, and spring 87 in valve casing 85 now commences to expand to such an extent as is admitted by the course of line DT which determines the position of feeler 92. As a result of all this, valve 86 again interrupts the connection between the annular spaces 96 and 104, whilst the connection between the annular spaces 95 and 96 is again established. The controlling valve 83 is now in its right-hand end position, so that the annular spaces 93, 94 still communicate with one another. Liquid under pressure can now pass from pipe 97$^1$ through annular spaces 93, 94, pipe 104, annular spaces 95, 96 and pipe 98 into space 99 to the right of piston 76, whilst liquid under pressure can be forced from space 100 to the left of the piston into pipe 97$^1$. As a result the piston 76 and with it carriage 11 is displaced in the direction of arrow U. This movement continues until feeler 92 reaches point T. When this is the case the pattern A no longer exerts a force on the feeler 92 during the movement of carriage 64 in the direction of arrow S, so that spring 87 can expand to such an extent as to move the controlling valve 86 back into its lower end position, i. e. into the initial position, where the annular spaces 95, 96 communicate with one another. By the above mentioned movement of carriage 11 in the direction of arrow U a restoring movement of controlling valve 83 is also started, which movement is terminated on point T being reached by the feeler 92. The controlling valve 83 has then again been brought back into its mid-position, in which it closes the annular space 94, whereby every transverse movement of the carriage 11 is prevented until handwheel 81 is again operated.

The flat milling cutter 1 as shown in Fig. 1 can be caused to adapt itself with as large a curved portion of its periphery as possible to any curved or twisted surface, which enables such a surface to be machined in a considerably shorter time and with greater accuracy than heretofore. The former is concerned mainly with the fact that the tool controlled in all directions by a feeler permits the surfaces of the blank to be machined in considerably wider lines, regarded in a plane at right angles to the plane of the drawing in Fig. 6, then hitherto and without deep tracks of the milling cutter being left for example, that is to say, the residues of material remaining between the various lines, i. e. the so-called combs are infinitesimally small so that therefore at the very most only a slight amount of grinding work is necessitated.

A grinding disc may also be used as a tool instead of a milling cutter for example.

What is claimed is:

1. A machine tool for machining curved surfaces, comprising chucking means for the blank to be machined and for a pattern; means for moving said chucking means in the longitudinal direction of the machine; a feeler for tapping off said pattern; a valve casing carrying said feeler; a gear box carrying a tool; a beam carrying said valve casing and gear box; a member connecting said valve casing to said gear box; means for moving said member for the purpose of imparting a rocking movement to said valve casing and said gear box in the transverse direction of the machine; a carriage in which said beam is so arranged that it can be rocked in the longitudinal direction of the machine; means for imparting a rocking movement to said beam; a cross beam carrying said carriage; means for moving said carriage in the longitudinal direction of said cross beam; standards for guiding said cross beam; and means for moving said cross beam in the vertical direction.

2. A machine tool for machining curved surfaces, comprising chucking means for the blank to be machined and for a pattern; means for moving said chucking means in the longitudinal direction of the machine; a feeler for tapping off said pattern; a valve casing carrying said feeler; a gear box carrying a tool; a beam carrying said valve casing and gear box; a member connecting said valve casing to said gear box; means for moving said member for the purpose of imparting a rocking movement to said valve casing and said gear box in the transverse direction of the machine; a carriage in which said beam is so arranged that it can be rocked in the longitudinal direction of the machine; means for imparting a rocking movement to said beam; a cross beam carrying said carriage; means for moving said carriage in the longitudinal direction of said cross beam; standards for guiding said cross beam; means for moving said cross beam in the vertical direction; a controlling valve arranged in said valve casing, which controls the movement of said cross beam in the vertical direction; and two further controlling valves also arranged in said valve casing and controlling said rocking movements in two planes at right angles to each other, said feeler acting on all said controlling valves when it taps off said pattern.

3. A machine tool for machining curved surfaces, comprising chucking means for the blank to be machined and for a pattern; means for moving said chucking means in the longitudinal direction of the machine; a feeler for tapping off said pattern; a valve casing carrying said feeler; a gear box carrying a tool; a beam carrying said valve casing and gear box; a member connecting said valve casing to said gear box; means for moving said member for the purpose of imparting a rocking movement to said valve casing and said gear box in the transverse direction of the machine; a carriage in which said beam is so arranged that it can be rocked in the longitudinal direction of the machine; means for imparting a rocking movement to said beam; a cross beam carrying said carriage; means for moving said carriage in the longitudinal direction of said cross beam; standards for guiding said cross beam; means for moving said cross beam in a vertical direction; a controlling valve arranged in said valve casing, which controls the movement of said cross beam in the vertical direction; two further controlling valves also arranged in said valve casing and controlling said rocking movements in two planes at right angles to each other, said feeler acting on all said controlling valves when it taps off said pattern; and adjusting elements for adjusting said feeler relatively to the pattern, whereby any adjustment of the pattern involves such a movement of said three controlling valves as to bring about automatically a corresponding adjustment of said tool.

4. A machine tool for machining curved surfaces, comprising chucking means for the blank to be machined and for a pattern; means for moving said chucking means in the longitudinal direction of the machine; a feeler for tapping off said pattern; a valve casing carrying said feeler; a gear box carrying a flat milling cutter; a beam carrying said valve casing and gear box; a member connecting said valve casing to said gear box; means for moving said member for the purpose of imparting a rocking movement to said valve casing and said gear box in the transverse direction of the machine; a carriage in which said beam is so arranged that it can be rocked in the longitudinal direction of the machine; means for imparting a rocking movement to said beam; a cross beam carrying said carriage; means for moving said carriage in the longitudinal direction of said cross beam; standards for guiding said cross beam; and means for moving said cross beam in a vertical direction.

5. A machine tool for machining curved surfaces, comprising chucking means for the blank to be machined and for a pattern; means for moving said chucking means in the longitudinal direction of the machine; a feeler for tapping off said pattern; a valve casing carrying said feeler; a gear box carrying a grinding disc; a beam carrying said valve casing and gear box; a member connecting said valve casing to said gear box; means for moving said member for the purpose of imparting a rocking movement to said valve casing and said gear box; a carriage in which said beam is so arranged that it can be rocked in the longitudinal direction of the machine; means for imparting a rocking movement to said beam; a cross beam carrying said carriage; means for moving said carriage in the longitudinal direction of said cross beam; standards for guiding said cross beam; and means for moving said cross beam in a vertical direction.

6. In a pattern controlled machine tool the combination of two supports, movable relatively to each other in a definite path; means operable to produce such motion; means on one of said supports for sustaining a pattern and a work piece in definite positional relationship to one another; two universally tiltable heads on the other support in a similar definite positional relationship to one another, namely, a tool head including a rotary tool shaft and a disc tool normal to and concentric with said shaft, and a feeler head including a feeler shaft axially displaceable through a small range and a feeler disc dimensionally similar to the disc tool, and mounted for universal tilting on the feeler shaft about a center, said center and the center of universal tilting of the feeler head being each on the geometric axis of the feeler shaft and each adjacent the feeling surface of the feeling disc, the tool head being universally tiltable about a center on the geometric axis of the tool shaft similarly adjacent the working face of the tool disc; means connecting said heads and arranged to impose correlated motion such that the tool shaft and feeler shaft maintain parallelism; motor means rendered active by tilting of the feeler disc away from that relative position in which the feeler shaft is normal to the feeling face of said disc, and serving to shift the heads in a direction or directions, as the case may be, to restore said normal relationship; and motor means controlled by axial displacement of the feeler shaft and serving to cause the feeler disc and consequently the cutter disc to follow the pattern as the supports move relatively to each other.

7. The combination defined in claim 6 in which both heads are mounted on a carriage adapted to be traversed in a direction transverse to the path of relative motion of the supports, the carriage including a member tiltable on arcuate guides about a primary geometric axis which passes through the geometric axes of the tool shaft and feeler shaft, and the heads being tiltable on respective arcuate guides carried by said tiltable member and centered on parallel secondary geometric axes which intersect the primary geometric axis at 90°.

8. The combination with the structure of claim 6 of two adjustable bosses projecting from the feeling face of the feeler disc and serving to cause said disc to have edge engagement with the pattern, whereby the tool may be caused to be similarly presented to the work piece.

9. In a pattern controlled machine tool the combination of two supports, movable relatively to each other in a definite path; means operable to produce such motion; means on one of said supports for sustaining a pattern and a work piece in definite positional relationship to one another; two universally tiltable heads on the other support in a similar definite positional relationship to one another, namely, a tool head including a rotary tool shaft and a disc tool normal to and concentric with said shaft, and a feeler head including a feeler shaft axially displaceable through a small range and a feeler disc dimensionally similar to the disc tool, and mounted for universal tilting on the feeler shaft about a center, said center and the center of universal tilting of the feeler head being each on the geometric axis of the feeler shaft and each adjacent the feeling surface of the feeling disc, the tool head being universally tiltable about a center on the geometric axis of the tool shaft similarly adjacent the working face of the tool disc; means connecting said heads and arranged to impose correlated motion such that the tool shaft and feeler shaft maintain parallelism; two double acting hydraulic motors connected to tilt said heads in respective planes at right angles to each other; two valves arranged to be actuated by displacement of the feeler disc about axes at right angles to each other from that relative position in which the feeler shaft is normal to the feeler face of the disc, each valve controlling a corresponding motor so as to tilt the heads in directions to restore said normal relationship; a double acting hydraulic motor for moving both heads toward and from the pattern and work piece; and a valve controlling the last named motor and connected with the feeler shaft to be actuated by axial displacement thereof.

10. The combination with the structure defined in claim 9 of a carriage guided on the head carrying support in a path transverse to the path of relative motion of said supports, said carriage serving as the means which support the heads; a manually controlled hydraulic motor for normally positioning the carriage; a secondary feeler adjacent said feeler disc and adapted to engage portions of the pattern which are inserted for guiding the feeler disc; and a valve controlled by said feeler and exercising a secondary control in said manually controlled carriage-positioning motor.

WALTER HEER.

REFERENCES CITED

The following references are of record in the file of this patent:

UNITED STATES PATENTS

| Number | Name | Date |
| --- | --- | --- |
| 2,341,194 | Schwartz | Feb. 8, 1944 |
| 2,345,494 | Onsrud | Mar. 28, 1944 |
| 2,332,532 | Roehm | Oct. 26, 1943 |
| 2,337,223 | Armitage | Dec. 21, 1943 |
| 2,335,625 | Wilson | Nov. 30, 1943 |
| 2,365,558 | King | Dec. 19, 1944 |